Oct. 8, 1940.    J. LONDON    2,217,593
BRACING FOR SUSPENSION BRIDGES
Filed June 29, 1939    2 Sheets-Sheet 1
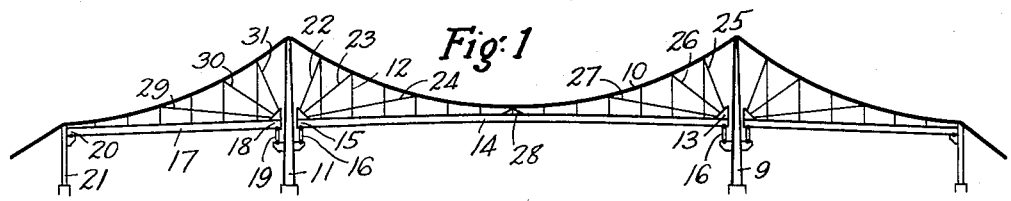
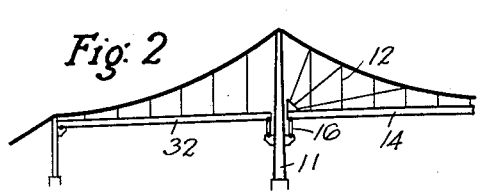
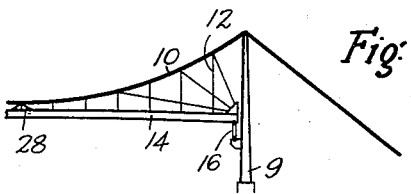
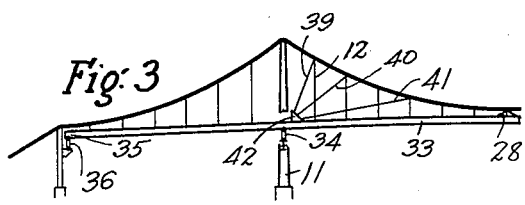
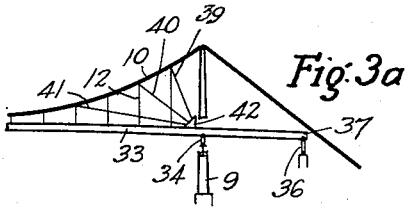
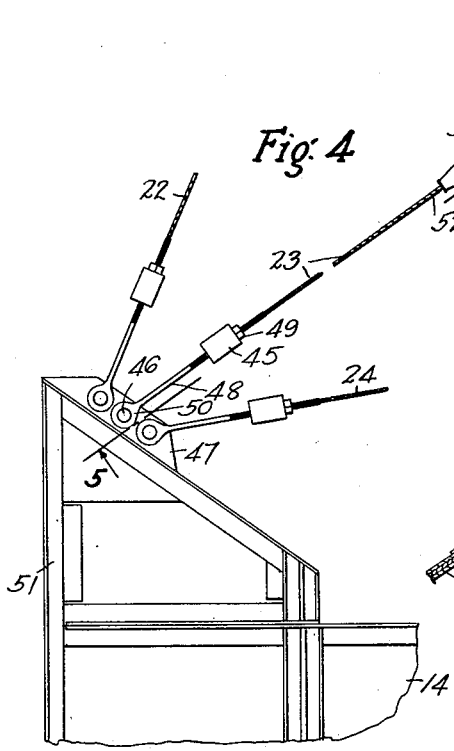
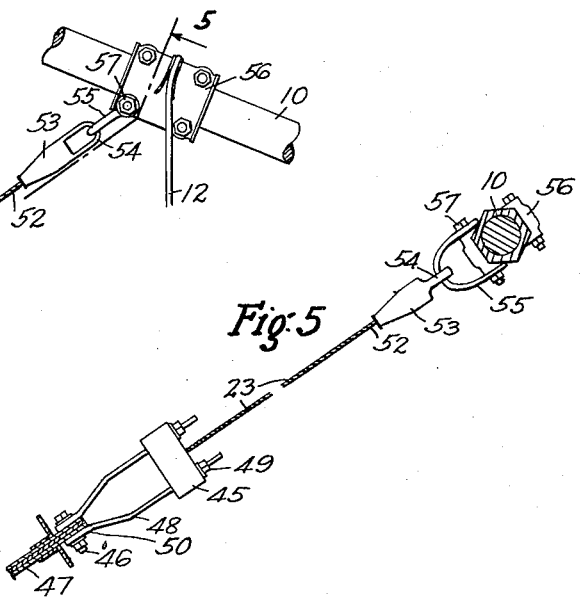
INVENTOR
Jacob London
BY
*Harry Jordan*
ATTORNEY Oct. 8, 1940.　　　　J. LONDON　　　　2,217,593
BRACING FOR SUSPENSION BRIDGES
Filed June 29, 1939　　　　2 Sheets-Sheet 2
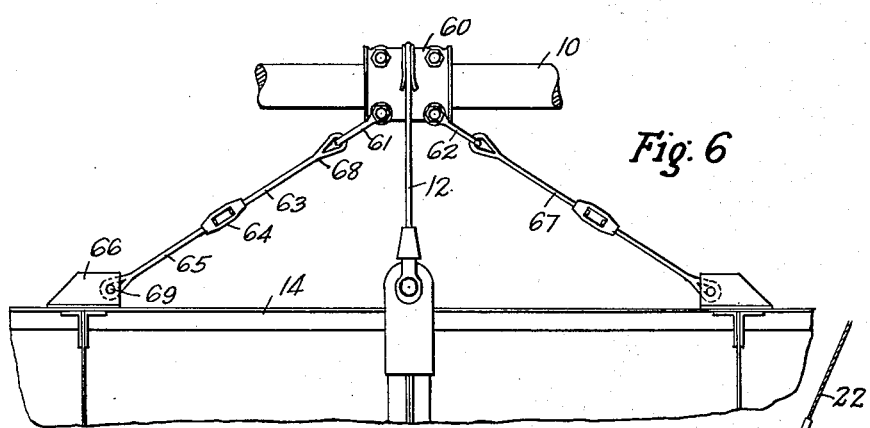
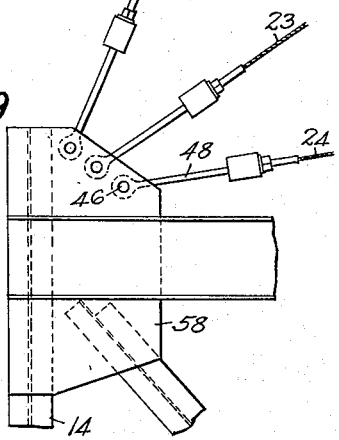
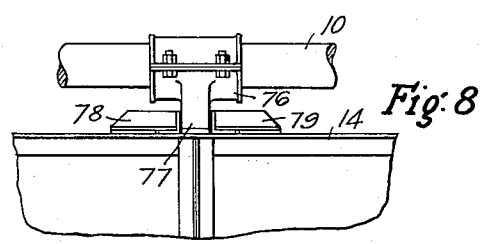
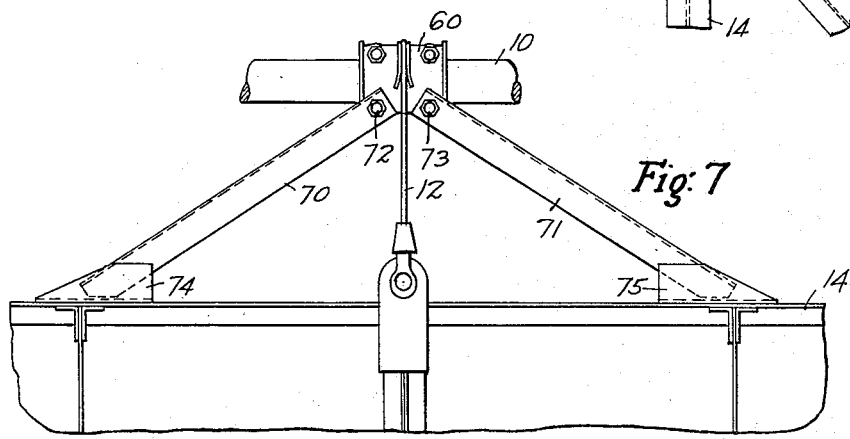
INVENTOR
Jacob London
BY
ATTORNEY Patented Oct. 8, 1940

2,217,593

UNITED STATES PATENT OFFICE 2,217,593

BRACING FOR SUSPENSION BRIDGES

Jacob London, New York, N. Y., assignor to Robinson & Steinman, New York, N. Y., a copartnership composed of Holton D. Robinson and David B. Steinman Application June 29, 1939, Serial No. 281,791

11 Claims. (Cl. 14—18)

This invention relates to suspension bridges and particularly to the bracing therefor to reduce deflections in the stiffening trusses, girders or floor system. In suspension bridges using catenary, parabolic or similarly shaped cables and stiffening trusses or girders, it is frequently practical and economical to make the depth of the stiffening truss or girder less than one per cent of the span length. This has been done in the Thousand Islands Bridge across the St. Lawrence River. It has been found, however, that under certain conditions of a quartering wind on the exposed high spans, the reduced depth of the stiffening trusses or girders permits harmonic oscillations in a vertical plane to be set up in the stiffening girders or trusses, as well as a longitudinal reciprocating movement.

Because of its economical feature, it is highly desirable that where possible, such bridges be designed with shallow girders or trusses, and they can be so designed and still made sufficiently rigid against all loads. The oscillations induced by the quartering wind, that is, a wind at an angle of about 30 to 60 degrees to the longitudinal line of the bridge, though of no consequence insofar as stresses on the bridge are concerned, is, nevertheless, psychologically objectionable to users of the bridge. Such wind also causes an objectionable longitudinal to-and-fro motion of the bridge or roadway caused by the longitudinal swinging of the suspended structure held by the suspenders. Loads other than dead loads, such as live loads peculiarly applied or traction and braking forces resulting from the starting and stopping of vehicles in comparatively large numbers may also in some cases induce the objectionable oscillation or longitudinal motion above referred to. To make the stiffening truss or girder of sufficient depth to eliminate the aforementioned oscillations and longitudinal swinging would result in prohibitive increased cost.

Attempts have heretofore been made to devise wind bracing and load bracing means to eliminate movement of the bridge stiffening means, but such bracing means consisting of inclined tension members secured to the cables and also secured to a fixed member such as a tower or pier of the bridge, have disadvantages rendering them inapplicable to overcome the problems above indicated. For example, temperature changes in the structure so slacken such bracing ties as to render them useless in warm weather and contract them in cold weather to such an extent that they are overstressed.

My invention therefore contemplates the provision of bracing means for eliminating vertical and longitudinal motion of the stiffening members or floor system of a suspension bridge, in which means the temperature changes compensate for the temperature changes in the bridge structure so that the bracing means is effective at all times and under all weather conditions.

My invention further contemplates the provision of stiff diagonal struts, tension stays or keys at the central portion of the span for operatively connecting the middle portion of the cable and the middle portion of the stiffening trusses, girders or floor system, to aid in anchoring the span against longitudinal motion and to aid in preventing the initiation of vertical oscillation.

My invention further contemplates the provision of diagonal stays or tension members extending from adjacent the expansion supports for the stiffening girders or trusses or floor system to intermediate panel points of the cables for more direct checking of vertical oscillations.

My invention further contemplates the provision of a combination of diagonal struts, tension stays or keys at the mid-portion of the span between the cables and stiffening means, and diagonal stays from the cable to the stiffening means to provide a highly economical but effective bracing means unaffected by temperature changes in the structure.

The various objects of the invention will be clear from the description which follows and from the drawings, in which, Fig. 1 is an elevation of a suspension bridge having a main span and side spans to which my invention has been applied.

Fig. 2 is a similar fragmentary view of a similar bridge having side spans, the bracing means being omitted from the side spans.

Fig. 2a is a similar fragmentary view of a similar bridge in which there are no suspended structures in the side spans.

Fig. 3 is a similar view of a similar bridge in which the stiffening means extends continuously past the towers.

Fig. 3a is a similar fragmentary view of a bridge similar to Fig. 3 but in which there are no suspended structures in the side spans.

Fig. 4 is a fragmentary enlarged elevational view of the diagonal stays and the means for connecting the stays to the cable and to the longitudinally extending structure supported by the cable, such as the stiffening trusses, girders or floor system, the stays being shown foreshortened.

Fig. 5 is a sectional view taken on the line 5—5 of Fig. 4.

Fig. 6 is an elevational view of the tension stays connecting the middle portion of the cable with the longitudinally extending suspended structure.

Fig. 7 is a similar view of a modified form of the same wherein struts are substituted for the stays.

Fig. 8 is a similar view of another modified form of the same wherein keys are employed.

Fig. 9 is an elevational view of a modified form of the connection between the diagonal stays wherein a truss constitutes the stiffening means.

It will be understood that my invention may be applied to a single span or multiple span suspension bridges with or without side spans and provided with any form of suspended structure such as stiffening means in the form of either girders or trusses, and with a floor system supported by the stiffening means or otherwise indirectly or directly supported by the cables. It is common practice to provide for temperature changes in the suspended structure by terminating the stiffening truss or girder for the middle span at the towers and suitably supporting the ends thereof on rollers, rockers or the like means permitting longitudinal expansion of the suspended structure. Similarly, the suspended structures of the side spans are customarily anchored at the respective outer ends thereof by rigid connections to piers or anchorages while the other ends of the suspended structure of the side spans are supported at or near the towers by rollers, rockers or the like, permitting longitudinal expansion and contraction thereof. The suspended structure may also be of the continuous type extending past the towers into the side spans and free to expand and contract at the ends thereof adjacent the anchorages. The present invention is intended to provide bracing means which are not affected by such expansion and contraction, regardless of whether the suspended structure is limited to the center span or extends into the side spans.

In the practical embodiment of the invention which I have shown by way of example in Fig. 1, the cables 10 are hung from the towers 9 and 11 in the customary manner. The suspenders 12 connected thereto serve to secure the suspended structure 14 to the cables whereby loads applied to the member 14 are transferred to the cables. The member 14 may take the form of a stiffening truss, a girder, or a floor system, but regardless of the form of the member, it extends throughout the middle span in the form shown in Fig. 1. Said member 14, if it constitutes a stiffening truss or girder, is preferably made of the least depth consistent with the required rigidity. In the Thousand Islands Bridge, for example, the depth of the stiffening girder 14 is only six feet, while the main spans in the two suspension bridges there used are eight hundred feet and seven hundred and fifty feet respectively.

The member 14 for the main span is supported by the towers through the intermediary of the rockers 16 at the respective ends 13 and 15 of the member, said rockers permitting longitudinal movement of the member 14 relatively to the towers 9 and 11. Similarly, the suspended structure 17 of the side span is free at its end 18 to move longitudinally of the tower 11, being held down by the rocker 19, and being anchored at its other end 20 in any suitable manner to the pier or anchorage 21.

As shown in Figs. 1, 4 and 5, I have provided means interposed between the cable and the ends of the member 14 adjacent the towers for bracing said member against undue longitudinal motion caused by wind and other forces, and also against oscillation in a vertical plane caused by said forces. The means utilized for this purpose are the upwardly diverging stays 22, 23 and 24 which are secured at their respective upper ends to spaced points of the cable 10, said stays being secured at their lower ends by a suitable connection to the end 15 of the member 14. Similar stays 25, 26 and 27 are similarly secured at their upper ends to the cable and are also secured at their lower ends to the other free end 13 of the member 14.

It is believed that the stays act in the following manner. Owing at least in part to the camber or slight upward arch of the suspended structure, as shown in Fig. 1, a quartering wind, blowing towards the left, exerts a force on the underside of the left half of the member 14 which would consequently tend to accentuate its upward convexity or to bulge upwardly between the member 16 and the center of the span. This action would permit the adjacent or left-hand portion of the cable 10 of the main span to rise. As the length of cable 10 between towers is fixed, the right half of the cable would consequently be lowered and the right half of the member 14 would then become convex downwardly or bulge downwardly between the center of the span and its end 13. In this manner, vertical oscillation of the member 14 would be initiated, one-half of this member rising while the other half would fall.

My bracing system minimizes this oscillation by the action of the stays 22, 23 and 24 which restrain the left half of the cable 10, preventing it from rising and consequently preventing the right half of the cable 10 from dropping. With the cable 10 held thusly, the vertical oscillation of the longitudinal member 14 is prevented. Similarly, the stays 25, 26 and 27 prevent the right half of the member 14 and that part of the cable supporting said half from rising and consequently prevent the left half from lowering.

The force exerted by a quartering wind on the member 14 would also produce a longitudinal oscillation of the suspended structure and, in order to eliminate this undesirable motion, I have provided a connection designated generally by the numeral 28 between the member 14 and the cable 10 at the middle portion of the middle span shown in Figs. 6, 7 and 8 as in the form of inclined or diagonal stays, or struts, or shear keys respectively. Said connection 28, whatever its form may be, being suitably connected to the cable and to the member 14, transfers the loads from the member into the cable. The various specific forms of the connection 28 will be later described.

It will be understood that while the action of the bracing system, consisting of the stays and the middle connection 28 has been explained with reference particularly to certain wind forces, the bracing system is also useful to restrain the objectionable vertical oscillation and longitudinal motion above described but which may result from other types of loads other than dead loads, as for example, certain live loads or vehicular or the like traction forces as will now be obvious.

As shown in Fig. 1, stays 29, 30 and 31, similar to the stays 22 to 27, may be used in the side span. When so used, the stays are connected at their lower ends to the expansion end as 18 of the suspended side span member as 17, the stays diverging upwardly and being connected to the continuation of the cable 10 at their upper ends. Since the stays being described are similar to each other in both side spans, this description of the stays for one side span will suffice for both.

It will be understood, however, that the stays 29, 30 and 31 may be omitted. As shown in Fig. 2, said stays are omitted in the side span having the suspended member 32, the stays and the connection 28 being used only for the center span which is substantially identical to the center span shown in Fig. 1. In the right-hand side span shown in Fig. 2a wherein there is no suspended structure, the bracing means hereinbefore described becomes unnecessary.

In Fig. 3, I have shown a suspended structure 33 extending not only throughout the main or middle span but also extending continuously through the side spans. My invention is applicable to the middle span of this type of bridge. Since the suspended structure 33 is continuous, it is held to the tower 11 by means of the rockers or the like 34 permitting longitudinal expansion and contraction and at its expansion end 35 is held down to the pier or anchorage by means of the rocker or the like 36, the other expansion end of the member 33 being similarly held so that the ends may move longitudinally under changes in temperature. In this form of my invention, the connection 28 at the mid-point of the middle span is retained but the bracing stays 39, 40 and 41 are connected at their lower ends to an intermediate point of the continuous member 33 as by means of the suitable connection 42. In this form of the invention, no diagonal stays are provided in the side span.

Referring now to Figs. 4 and 5, the connection between the lower ends of the long inclined stays and the expansion end 15 of the member 14 or an intermediate point of the continuous member 33 adjacent the tower, may take various forms to resist the shear and overturning moment from the stays. As shown, the adjustable socket 45 receives the lower end of the stay 23 and is pivoted to the pin bolt 46 on the bracket 47 by means of the bolts 48 passing through the socket and each held thereto at one end by the nuts 49 and at their other ends terminating in the eyes 50 held by the pin bolt 46. The other stays are similarly secured at their lower ends to the bracket 47, which is in turn secured to the member 14, shown in the form of a girder, by suitable connections of any well known type such as the angles 51. The means just described constitutes a direct connection between the stays and the member 14, adjustable however, by means of the nuts 49. The upper end 52 of the stay 23 is secured to the looped socket 53 terminating in an eye 54 held by the shackle bolt 55, which is in turn pinned to the cable band 56 as by means of the bolt 57.

In Fig. 9, the bracket is shown in the form of gusset plates 58 secured to the member 14 and outstanding therefrom to a sufficient extent to provide an extension through which the pins or bolts 46 may be passed for pinning the open bridge socket at the ends of the stays to the plates by means of the bolts 48. The member 14 is here shown in the form of a truss. In either case, the stays diverge upwardly to spread out at the cable for connection thereto at spaced points which are above the intermediate part of the member 14. The connection 42 being similar to the connection at 13 and 15, no detailed description thereof is needed.

In Figs. 6, 7 and 8, I have shown three specific forms of the middle connection 28. Referring first to Fig. 6, to the cable band 60 are pivoted the shackle bolts 61 and 62. The bolt 61 passes through the loop 68 at one end of the tension member 63 shown in the form of a rod. At its other end, the rod 63 is threaded for engagement with the turn-buckle 64 which also engages one end of the rod 65. The other end of said rod is secured to the member 14 by the angle bracket 66, to which said other end is pinned as by means of the pin 69. The shackle bolt 62 similarly holds the other tie or stay 67, which is constructed similarly to the tie 63, 65 and is similarly secured to the member 14.

In Fig. 7, I have shown diagonal struts 70 and 71 secured to the cable band 60 on the cable 10 by means of suitable bolts 72 and 73 respectively. The lower ends of said struts are in turn secured as by rivets, welding or the like to the angle brackets 74, 75 respectively, which are in turn secured to the member 14.

As shown in Fig. 8, shear keys may be employed at the middle of the main span when the cable and the member 14 are sufficiently close together, to aid in preventing the objectionable longitudinal movement of the member 14 above described. In this form of the connection 28, the lower half 76 of the cable band is provided with a lug 77 interposed loosely between the spaced brackets 78 and 79 secured to the member 14.

It will be seen that I have provided an economical bracing structure which is applicable to various types of suspension bridges, which is self-compensatory for temperature changes since the stays forming part thereof are secured to the expansion end or an intermediate point of the suspended structure and to the cables with the result that increases and decreases in the length of the structure are compensated for by corresponding increases and decreases in the length of the stays; that struts, stays or shear keys at the middle of the cable constitute the remaining part of the bracing and are also unaffected by temperature changes; that my improved bracing means permits the use of low depth stiffening trusses or girders and that by the use of suitably arranged stays and struts, all undesirable longitudinal motion, as well as material vertical oscillations of the suspended structure, is adequately prevented in an efficient and economical manner.

While I have shown and described certain specific embodiments of my invention, I do not wish to be understood as limiting myself thereto but intend to claim the invention as broadly as may be permitted by the state of the prior art and the scope of the appended claims.

I claim:

1. In a suspension bridge having a cable and having a structure suspended from the cable, inclined stays connected to the cable and to a point of said structure, a lug connected to and extending from the mid-portion of the cable, and a pair of spaced brackets fixed to the mid-portion of the structure and receiving the lug therebetween.

2. In a suspension bridge having towers and having cables hung from the towers, a member extending longitudinally of the bridge and supported by the cables, said member being free to expand and thereby to move at least one of its end portions longitudinally and relatively to the adjacent tower, and stays fixed at their upper end to spaced points of the cable, said points being above an intermediate part of the member, said stays being fixed at their lower ends to said one end portion and expanding and contracting under temperature changes to compensate for changes in the length of said longitudinally extending member and said stays transferring into the cable loads tending to move said member longitudinally and vertically.

3. In a suspension bridge provided with a tower and with cables hung from the tower, a longitudinally arranged member suspended from the cables and extending throughout at least one span of the bridge, means carried by the tower for supporting the member for longitudinal movement relatively to the tower, said member being free to move longitudinally relatively to the tower when said member expands and contracts as a result of temperature changes therein, and bracing means comprising inclined stays interposed between and fixed to the cable and to a part of said member adjacent the tower and converging toward each other from the cable toward said part, the horizontal distance between the cable-attached points of the stays and the middle point of the member being less than the horizontal distance between the member-attached points of the stays and said middle point.

4. In a suspension bridge provided with cables and with a longitudinally extending stiffening member supported by the cables, a pair of spaced supports hingedly supporting the member for free movement longitudinally and relatively to the supports, means for bracing said member against forces tending to move the member vertically and longitudinally, said means comprising inclined stays each fixed at one end thereof to an intermediate point of a cable and at the other end thereof to the member at a point adjacent one support, said stays extending toward the other support, and inclined members each fixed at the one end thereof to the mid-portion of the stiffening member, and at the other end thereof adjacent the mid-point of the cable.

5. In a suspension bridge provided with a cable and with a longitudinally extending member supported by the cable, a pair of spaced supports for the member, a hinged connection between the member and at least one of the supports, and bracing means expansible and contractible with the member and comprising inclined diverging stays extending from a point on said member adjacent said one support to spaced points on the cable in a general direction toward the other support.

6. In a suspension bridge provided with a cable and with a longitudinally extending member supported by the cable, spaced upright supports for the member, means connecting the member to the supports and permitting longitudinal movement of the member relatively to at least one of the supports, bracing means expansible and contractible with the member and comprising inclined stays extending from a part of said member adjacent said one of the supports to spaced points on the cable between the supports, and inclined struts extending from the mid-point of said member to points on the cable adjacent the middle point thereof and resisting longitudinal movement of the member other than expansion and contraction thereof.

7. In a suspension bridge provided with a cable and with a longitudinally extending girder supported by the cable, a pair of spaced supports for the cable and the girder, a hinged connection between the girder and at least one of the supports, bracing means between the girder and the cable for resisting longitudinal and vertical movement of the girder and for transferring into the cable the loads on said girder, said means comprising inclined stays connected at their upper ends to spaced points of the cable between the supports and at their lower ends respectively to points of the girder adjacent the supports, and members extending between the middle portions of the cable and said girder and secured to the cable and engaging said girder, the stays at one of said points of said girder resisting vertical movement of the other end part of the cable.

8. In a suspension bridge having towers and provided with a cable hung from the towers and with a longitudinally extending member supported by the cable and extending throughout a span of the bridge, at least one end of said member being free to move longitudinally relatively to the adjacent tower on the expansion and contraction of the member under temperature changes therein, a plurality of inclined tension stays extending from said end of the member to the cable in a direction upwardly and toward the other end of said member, said stays diverging from each other and being connected at their respective upper ends to spaced points of the cable.

9. In a suspension bridge having a cable, and having a longitudinally extending bridge stiffening member free to expand and contract, inclined stays connected at their upper ends to spaced intermediate points of the cable and connected at their lower ends to closely adjacent points of that part of the member which moves longitudinally on the expansion and contraction of the member, said stays anchoring a relatively movable part of the member to the cable and thereby resisting longitudinal and vertical movement thereof, the horizontal distances between the upper ends of the stays and the middle point of the member being less than the horizontal distance between the lower ends of the stays and said middle point.

10. In a suspension bridge having a cable and having a longitudinally extending stiffening structure supported by suspenders hung on the cable and free on at least one end part thereof to expand and contract, inclined stays each connected at its lower end to said one end part of the structure, the respective upper ends of said stays being connected to spaced-apart points of the cable above an intermediate part of the structure.

11. In a suspension bridge, a cable, a longitudinally extending bridge stiffening structure hung from the cable and free on at least one end to expand and contract, upwardly diverging inclined stays secured at their lower ends to the structure at a point nearer said one end than the other end of the structure and secured at their upper ends to spaced-apart points of the cable above an intermediate part of the structure, said spaced apart points being each at a lesser distance from the other end of the structure than the lower ends of the stays, and additional inclined upwardly converging members each connected to a middle part of the stiffening structure and to a middle part of the cable.

JACOB LONDON.